Oct. 23, 1962     E. S. SMITH     3,059,776

GOLD PAN

Filed March 21, 1960

INVENTOR.
*Eric S. Smith*
BY
*Fred C. Matheny*
ATTORNEY.

3,059,776
GOLD PAN
Eric S. Smith, 611 33rd Ave. N., Seattle, Wash.
Filed Mar. 21, 1960, Ser. No. 16,544
3 Claims. (Cl. 209—447)

My invention relates to a gold pan.

An object of my invention is to provide an improved gold pan which will make it easier to recover and save gold by panning and which will make it possible for the user of the pan to recover, from material having valuable heavy metals, such as gold, therein, a higher percentage or the gold or like heavy metal than is ordinarily recovered by the use of a conventional gold pan.

Another object is to provide a gold pan which makes possible the recovery of gold from some types of gold bearing material by a dry panning process and without the use of water.

Another object is to provide a gold pan which has, on its peripheral rim portion, an inwardly facing concave trap extending continuously for a substantial part of the distance around the periphery of said pan, said trap catching the gold and heavier metals while permitting the lighter material to escape and be discharged thereover.

Another object is to provide a gold pan which has a peripheral trap and which has riffles or grooves in the inclined wall thereof inwardly from the peripheral trap, said riffles or grooves helping to agitate the material being panned, whereby the heavy metals will settle faster and will be more liable to be caught either in the trap or in the grooves.

Other objects of my invention will be apparent from the following description taken in connection with the accompanying drawings.

In the drawings FIGURE 1 is a fragmentary top plan view of a gold pan constructed in accordance with my invention.

Like reference numerals refer to like parts throughout the several views.

Figure 1:
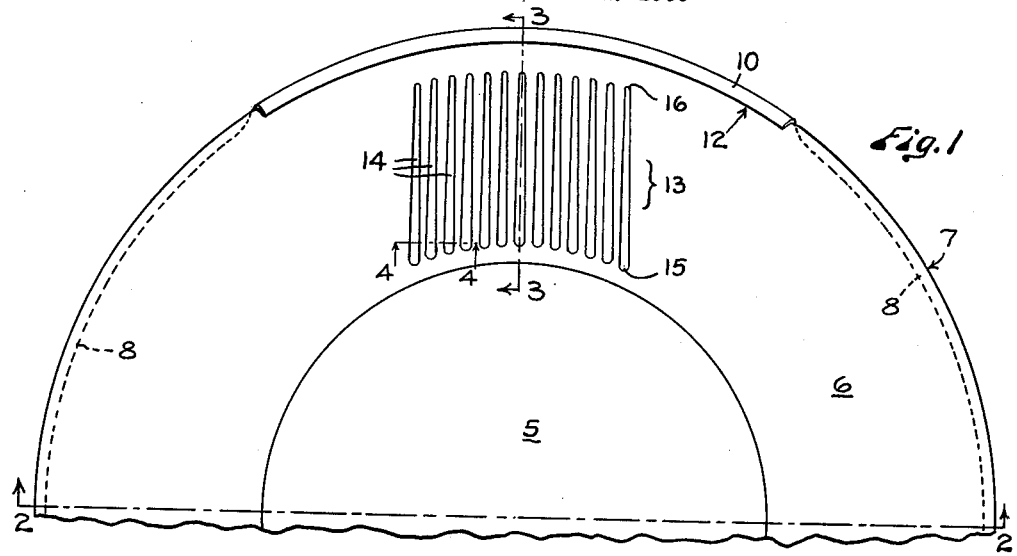
Figure 2:
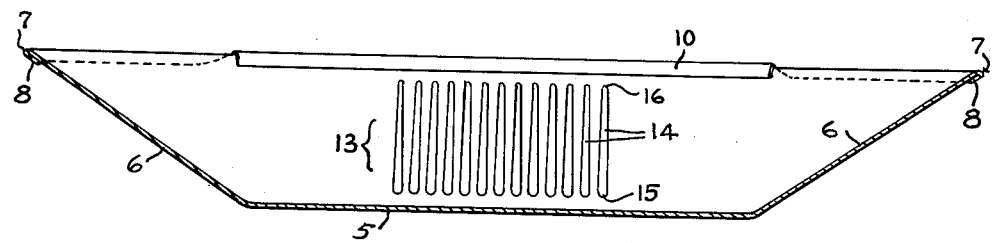
FIG. 2 is a sectional view, with parts in elevation, taken substantially on broken line 2—2 of FIG. 1.

The drawings show a gold pan of conventional shape made of sheet metal and having a flat bottom 5 and an upwardly and outwardly inclined side portion 6. The side portion 6 terminates in an annular peripheral rim 7 which is reversely bent downwardly and inwardly in forming a reinforcing flange 8 that extends partially but not entirely around the pan. The size and shape of the pan can be varied. A pan about fifteen inches in diameter with a flat bottom 5 which is from eight to nine inches in diameter and sides inclined upwardly from the bottom at an angle of from thirty to thirty five degrees is satisfactory. Obviously the bottom of the pan does not need to be flat but can be somewhat concave if desired.

An inwardly facing concave trap 10 extends continuously for a substantial part of the distance around the annular peripheral rim portion of said pan. The length of this trap can be varied but I find that, in a pan of the size hereinabove mentioned, it is satisfactory if this trap is made about ten inches long, measured on a chord from end to end thereof.

If the pan is made of sheet metal the trap 10 is preferably formed by bending the peripheral rim portion of the side wall 6 upwardly and inwardly so that said trap 10 is approximately channel shape in cross section. Preferably the inner edge portion 11 of the metal used in forming the trap 10 is reversely bent upwardly and outwardly to provide a reinforcing and wear resistant part over which sand, small gravel and the like may pass during the panning of material. Also preferably the innermost edge portions of the parts used in forming the trap 10 are flattened somewhat to form a fairly sharp inner edge 12.

Figure 4:
FIG. 4 is an enlarged fragmentary cross sectional view taken substantially on broken line 4—4 of FIG. 1.
Figure 3:
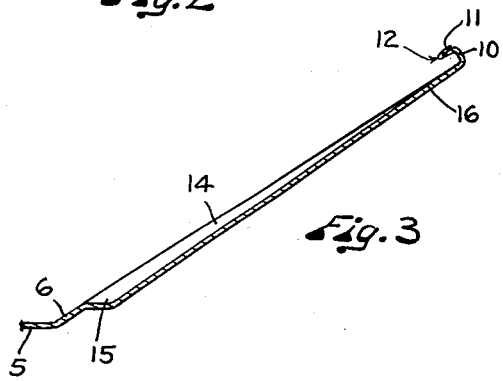
FIG. 3 is an enlarged cross sectional view taken substantially on broken line 3—3 of FIG. 1.

The inclined side wall 6 of the pan can be left smooth throughout its entire area. If this is done the trap 10 will substantially increase the efficiency of the pan. However, I find that a further increase in efficiency can be obtained and a higher percentage of the heavier metals caught in the trap if I provide, in a section 13 of the inclined side 6 of the pan inwardly from the trap 10, a plurality of side-by-side riffles or grooves or troughs 14. Preferably the riffles or grooves 14 are in the form of corrugations made by pressing the groove forming parts of the metal outwardly, as shown in FIGS. 3 and 4. Also preferably these riffles or grooves 14 are deeper at their lower or inner ends 15, FIG. 3, and taper out at their upper or outer ends 16 at a location near the trap 10. The riffles or grooves 14 extend generally crosswise of the inclined side walls 6 and preferably the section 13 occupied by said riffles or grooves is about four inches wide, in a pan of the dimensions hereinbefore referred to.

The pan is used in the same manner as an ordinary gold pan. When in use it is held with the trap 10 outwardly from the user and panning movement is imparted thereto, tending to cause the heavier particles of material therein to settle, by gravity, and the lighter particles to rise so they can be discharged over the trap 10 at the rim of the pan. The usual movement imparted to the pan tends to cause the material to move across the riffles or grooves 14. This helps in agitating and stirring the material and in causing the heavier particles to settle into the grooves 14 and the grooves 14 tend to direct this heavier material outwardly in such a manner that it is caught in the trap 10. The riffle or grooved section 13 thus functions like a miniature concentrating table in assisting in the separation of the heavier values from the lighter material. The heavier material caught in the trap 10 is easily discharged from either end of said trap when the panning of a batch of material is completed.

The provision of the peripheral trap 10, and the section 13 of riffles or grooves 14 in the side wall 6 inwardly from said trap 10 makes it possible for a person using my pan to pan gold bearing material much faster than is possible with a conventional pan, and at the same time, to get a higher percentage of recovery of values from the material panned. Also my pan can be successfully used in panning dry material which contains particles of gold or like heavy particles of value. This is of advantage in dry locations where no water is available.

The foregoing description and accompanying drawings clearly disclose a preferred embodiment of my invention but it will be understood that changes in the same may be made within the scope of the following claims.

I claim:

1. A device for separating gold from placer material comprising a pan having an upwardly and outwardly extending side wall which terminates in an annular peripheral rim; and an inwardly facing concave trap of shallow depth and narrow thickness permanently and rigidly connected with said annular peripheral rim and extending continuously for a substantial part of the distance but substantially less than half way around said annular peripheral rim, said trap leaving the side wall of said pan inwardly from said rim unobstructed throughout substantially its entire width and said trap being open at its ends facilitating discharge of concentrates from said open ends, the narrow thickness of said trap providing for a free discharge of lighter material thereover.

2. A device for separating gold from placer material comprising a pan having an upwardly and outwardly extending side wall terminating in an annular peripheral rim; an inwardly facing concave trap of shallow depth extending continuously for a substantial part of the distance around said annular peripheral rim, said trap being confined to the rim part of said pan and leaving the side wall of said pan inwardly from said rim unobstructed throughout substantially its entire width and at least one end of said trap being open facilitating discharge of concentrates from said open end; and a plurality of spaced apart side-by-side riffles extending in generally radial directions crosswise of said side wall inwardly from said trap, the outer ends of said riffles being positioned close to said trap.

3. A device for separating gold from placer material comprising a pan having an upwardly and outwardly extending side wall terminating in an annular peripheral rim; an inwardly facing concave trap of shallow depth extending continuously for a substantial part of the distance around said annular peripheral rim, said trap being confined to the rim part of said pan and leaving the side wall of said pan inwardly from said rim unobstructed throughout substantially its entire width and at least one end of said trap being open facilitating discharge of concentrates from said open end; and a corrugated section in the side wall of said pan inwardly from said trap, the corrugations of said section being outwardly displaced relative to the side wall of the pan and said corrugations providing grooves extending in generally radial directions crosswise of said side wall, said grooves being deeper and wider at their inner ends and narrower and shallower at their outer ends, and the outer ends of said grooves being positioned close to said trap.

References Cited in the file of this patent

UNITED STATES PATENTS

| | | |
|---|---|---|
| 764,197 | Muhleman | July 5, 1904 |
| 923,392 | White | June 1, 1909 |
| 1,292,364 | Ord | Jan. 21, 1919 |
| 1,443,608 | Bleakley | Jan. 30, 1923 |
| 2,802,411 | Riener | Aug. 13, 1957 |

FOREIGN PATENTS

| | | |
|---|---|---|
| 7,754 | Great Britain | 1902 |